(12) United States Patent
Koenig

(10) Patent No.: US 7,647,773 B1
(45) Date of Patent: *Jan. 19, 2010

(54) GROUND SOURCE HEAT PUMP WELL FIELD DESIGN AND CONTROL STRATEGY FOR LARGE TONNAGE

(75) Inventor: Albert A. Koenig, Coatesville, PA (US)

(73) Assignee: American Refining Group, Inc., West Conshohocken, PA (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/657,553

(22) Filed: Jan. 25, 2007

Related U.S. Application Data

(60) Provisional application No. 60/761,794, filed on Jan. 25, 2006.

(51) Int. Cl.
*F03G 7/00* (2006.01)

(52) U.S. Cl. ..................................... 60/641.2
(58) Field of Classification Search ...... 60/641.2–641.5
See application file for complete search history.

(56) References Cited

U.S. PATENT DOCUMENTS

| | | | |
|---|---|---|---|
| 2,461,449 A | | 2/1949 | Smith et al. |
| 3,339,629 A | * | 9/1967 | Hervey .......................... 165/45 |
| 4,054,176 A | * | 10/1977 | Van Huisen ................... 165/45 |
| 4,205,718 A | * | 6/1980 | Balch ............................ 165/45 |
| 4,392,531 A | * | 7/1983 | Ippolito ....................... 166/278 |
| 4,448,237 A | | 5/1984 | Riley |
| 4,461,157 A | | 7/1984 | Shapess |
| 4,483,318 A | | 11/1984 | Margen |
| 5,183,100 A | | 2/1993 | Harrell, Jr. |
| 6,925,830 B2 | | 8/2005 | Xu |
| 2004/0206085 A1 | | 10/2004 | Koenig et al. |
| 2006/0101820 A1 | | 5/2006 | Koenig et al. |

* cited by examiner

*Primary Examiner*—Hoang M Nguyen
(74) *Attorney, Agent, or Firm*—Duane Morris LLP

(57) ABSTRACT

The present invention features geothermal systems that use of a well field open loop scheme by interconnecting the well field through a system of mains and controlled branches, the latter composed of multiple (2-5) wells. The proposed design lends itself to the use of modular well field kits that minimize installation cost, insures equal return water distribution to the active wells, creates standardization and insures best practices. The benefits of individual branch control include the ability to serve the building load in staged delivery, thereby minimizing well field parasitic load, and maximizing the time available for well field thermal relaxation and availability.

27 Claims, 4 Drawing Sheets

GROUND SOURCE HEAT PUMP WELL FIELD DESIGN AND CONTROL STRATEGY FOR LARGE TONNAGE

CROSS REFERENCE TO RELATED APPLICATION

The present application hereby claims the priority of U.S. Provisional Patent Application Ser. No. 60/761,794, filed on Jan. 25, 2006, entitled "Ground Source Heat Pump Well Field Design and Strategy for Large Tonnage." The present application incorporates by reference the entire disclosures of U.S. Provisional Patent Application Ser. Nos. 60/463,032 and 60/463,033, both filed on Apr. 16, 2003, and U.S. patent application Ser. Nos. 10/825,659, filed on Apr. 16, 2004, and 11/262,740, filed on Nov. 11, 2005.

TECHNICAL FIELD

The present invention relates to geothermal systems with improved well field design and control strategies for efficient operation of multiple geothermal wells having large tonnage.

BACKGROUND

Conventional heating or cooling systems require energy from limited resources, e.g., electricity and natural gas, which have become increasingly more expensive and are at times subject to shortages. Much attention has been given to sources of energy that exist as natural phenomena. Such energy includes geothermal energy, solar energy, tidal energy, and wind-generated energy. While all of these energy sources have advantages and disadvantages, geothermal energy, i.e., energy derived from the Earth or ground, has been considered by many as the most reliable, readily available, and most easily tapped of the natural phenomena.

Ground water-based geothermal systems have been used with heat pumps or air handling units to satisfy building HVAC (heating, ventilation, and air-conditioning) loads. These systems are favored because geothermal systems are environmentally friendly and have low greenhouse emissions.

The use of vertical water wells as a thermal source/sink for efficient ground source heat pump (GSHP) operation has been in substantive practice since the 1980s. The most often specified system today is a closed loop system that employs polypipe grouted into the wellbore. These grouted loop (GL) systems operate with a secondary heat transfer fluid between the well bore and the heat pump (HP) heat exchanger. While GL systems offer relatively low maintenance over the lifetime of the installation, the high initial cost of the well field is a handicap to universal acceptance.

Standing column well (SCW) systems, on the other hand, operate as traditional water wells. Each well requires its own pump, which at some point will require replacement. SCW can operate in an open loop or closed loop mode. Traditionally, an open loop system requires a minimum of two SCW, one that supplies water to a building and the other that receives or accepts the return water, a so-called "pump & dump" operation. SCW can also be configured in a closed loop, i.e. returning water originally supplied from the well back to the same well. The benefit of the latter system is that it maximizes heat transfer to the well bore rock, provided that the entire length of the well is used in the heat exchange, a mechanism described in U.S. Pat. No. 5,183,100, incorporated herein. Because of this improved heat transfer, SCW systems require typically half the number of wells drilled as closed loop systems. This translates into significant initial savings to the owner.

In reviewing prior SCW system installations, Applicant has realized the presence of an opportunity to make improvements in the well field components, the installation and the operation of the system, which can be expected to further reduce the installed cost of the system, while moving toward standardization and a set of best practices. The subject of the present application is especially relevant to large installations that provide the best opportunity to demonstrate significant cost advantages. The present application focuses on the well field design, operation, components and installation practices to affect an optimal, low cost solution, insuring equal return water distribution to the active wells, and creating standardization and a set of best practices.

SUMMARY OF THE INVENTION

The present invention features SCW geothermal systems and methodologies with improved control strategies for efficient operation of multiple geothermal wells.

In many embodiments, a ground source heat pump system of the present invention includes a plurality of geothermal wells, a building heat exchanger, main piping, branch control valves, and a stepped pipe header design.

In one embodiment, each geothermal well is arranged in a plurality of branch arrays (rows) or block (group of branches) which can be active or inactive.

In another embodiment, the building heat exchanger receives supply water from a plurality of geothermal wells, modifies the temperature in the process of transferring heat, and returns thermally-modified water to the plurality of active branch arrays or rows. In the present invention, branch control valves, located at the return entrance to each branch or row, can receive command signals from the master controller to activate or deactivate a particular branch or block of geothermal wells. The branch control valve of the present invention is typically located in the field and is electrically-operated and synchronized with the on-signal for the well pumps in the active branch according to commands from the master controller.

In yet another embodiment, the return water branch piping is designed as a stepped pipe header that incorporates flow control orifices for the restriction of water returning to each of the geothermal wells in a given branch such that each geothermal well has equal return flow. The orifice diameters along the stepped header are located in descending order from the return entrance, e.g. 3.0, 2.5, 2.0, 1.5 or 1.25 inch for the case of five wells in a branch or row, as described in more detail hereinbelow. In one instance, a stepped pipe header is used to apportion the flow along the branch, while individual orifice control the entry to each geothermal well in a given branch or row.

In a further embodiment, the geothermal wells of the present invention are SCW and a plurality of branch arrays may have 2-5 geothermal wells per array.

The ground source heat pump system of the present invention may further comprise a controller that operates from an algorithm that can activate or deactivate at least a plurality of branches or blocks upon occurrence of a condition to meet the current building load. Exemplary conditions include, but are not limited to, the building's anticipated diurnal load profile, the current measured building load, the well water temperature, the thermal recovery time, the heat exchange time, the activity level of each geothermal well field branch array, the expected daily use, outside temperature, and climatic or building historical data records.

The present invention also includes a water well field hydraulic branch plumbing kit for large tonnage ground source heat pump applications that include a plurality of sections of branch header with appropriate orifice controls for connecting a plurality of geothermal wells arranged in a plurality of branch arrays. Each section of a branch header can be manufactured in lengths appropriate to the specified well center-to-center spacing and clearly marked for joining in the field to its preceding section.

The water well field hydraulic branch plumbing kit of the present invention also includes a plurality of branch pipe fittings required to meet the combined flow and can be based on a design of 4-8 fps (feet-per second), a field array controller that operates in tandem with the building HVAC equipment; submersible water pumps operating at peak efficiency to produce branch flow rates in the range of 160-180 gpm; and a plurality of branch control valves that provides equal return flow to each of the active branch array of geothermal wells.

In one embodiment, the field controller for the water well field hydraulic branch plumbing kit further includes a RISC processor.

In another embodiment, the plurality of pipe, valves and fittings that compose the branch headers can be joined together by thermal fusion or gluing. The size of the pipe fittings can range from 1.25-3.0 inches.

In yet another embodiment, the electrical field bus to operate the water pumps and branch control valves can be run in the same conduit. On the other hand, the signal wiring from the field can be run in a separate signal conduit.

In still another embodiment, the ground source heat pump system includes a plurality of geothermal wells that supply water to a heat exchanger and a flow control system. Water from the heat exchanger, in turn, is returned to the geothermal wells. The flow control system includes respective return headers on each geothermal well for controlling the water being returned to the respective geothermal wells, whereby the amount of water removed from each geothermal well is commensurate with the amount of water returned. The geothermal wells are arranged in at least one branch, whereby commingled water flows from each geothermal well in at least one branch to the heat exchanger and commensurate amounts of water return to the respective geothermal wells in a return branch. In one embodiment, return headers on each geothermal well in a branch utilize different size orifices for balancing the return water. In another embodiment, the orifice of the return header at the intake portion of the branch is smaller than subsequent orifices located along that branch.

In one embodiment, the ground source heat pump system of the present invention includes a plurality of geothermal wells that are arranged in a plurality of branches; and a branch control system. The branch control system includes a control to activate and deactivate respective branches pursuant to a usage factor. Exemplary usage factors include, but are not limited to, the building anticipated diurnal load profile, the current measured building load, the well water temperature, the thermal recovery time, the heat exchange time, the activity level of each geothermal well field branch array, the expected daily use, outside temperature, and climatic or building historical data records. The amount of water from geothermal wells in a respective branch is commensurately returned to the respective branch. Similarly, the respective amounts of water removed from respective branches are commensurately returned to the respective branches.

Other features, objects, and advantages of the present invention are apparent in the detailed description that follows.

It should be understood, however, that the detailed description, while indicating preferred embodiments of the invention, are given by way of illustration only, not limitation. Various changes and modifications within the scope of the invention will become apparent to those skilled in the art from the detailed description.

BRIEF DESCRIPTION OF THE DRAWINGS

The Drawings illustrate exemplary embodiments of the principles set forth in the specification, and are not construed to act by way of limitation. It should be understood, therefore, that variations upon the figures in the Drawings and descriptions in the text are permissible, and contemplated as being within the contours of the claims and accorded the widest possible scope consistent with the principles and features set forth herein.

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

For large tonnage (200-1000 tons) systems, such as schools, commercial buildings and residential complexes, a typical standing column well (SCW) ground source heat pump (GSHP) system of the present invention for a well field includes two or more geothermal wells that are arranged in a plurality of branch arrays or blocks, a building heat exchanger, a branch control valve and a branch stepped pipe header design. Smaller tonnage systems (less than 200 tons) can be similarly deployed, albeit not as large. A smaller tonnage system is similar to the one set forth hereinbelow and described in connection with FIG. 1, and larger tonnage systems are described in connection with FIG. 3.

Figure 1:
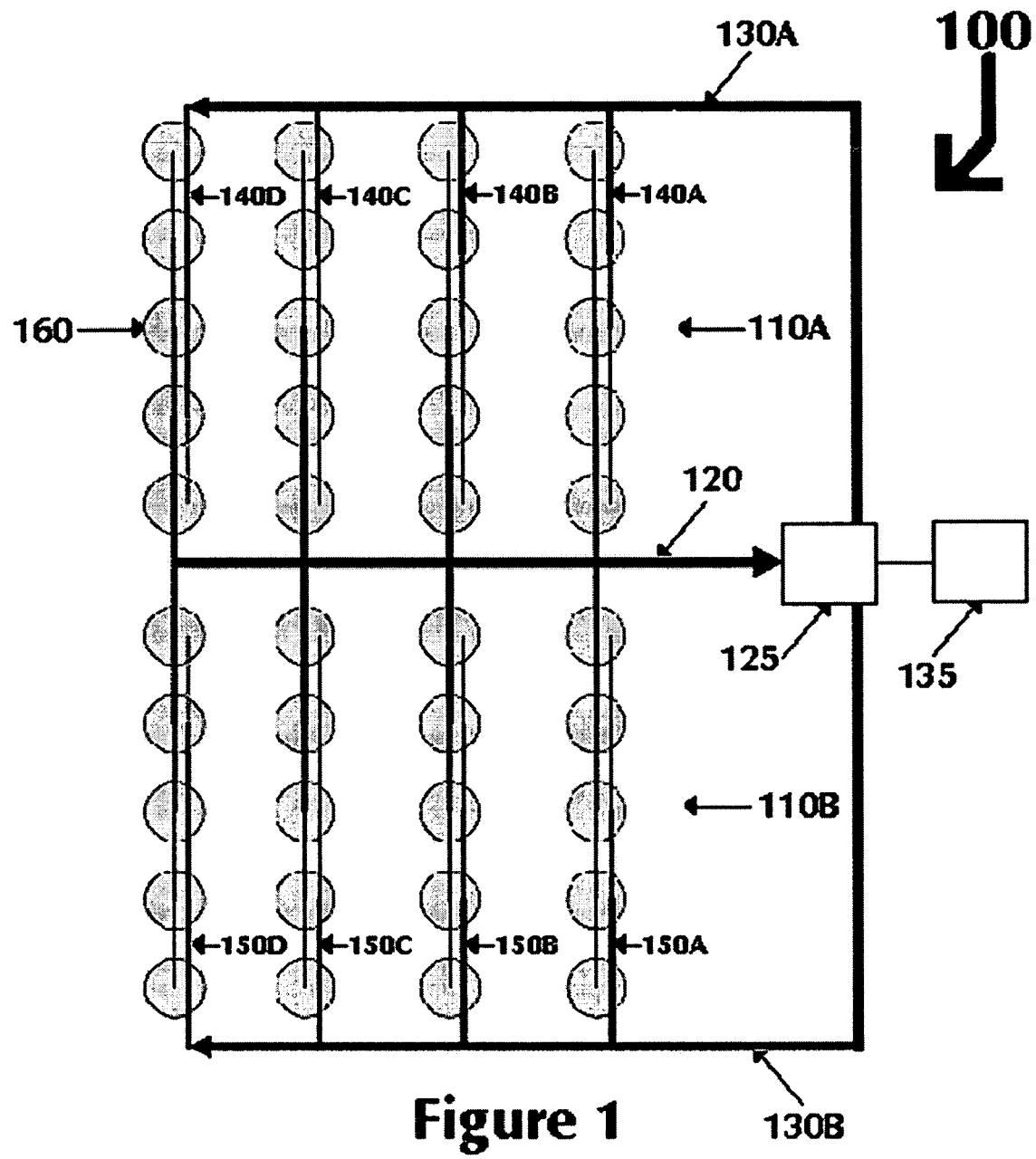
FIG. 1 illustrates a proposed large well field hydraulic interconnection scheme for ground source heat pump (GSHP) application using controlled parallel branches, stepped headers and runs in a balanced configuration to minimize building penetrations.
Figure 2:
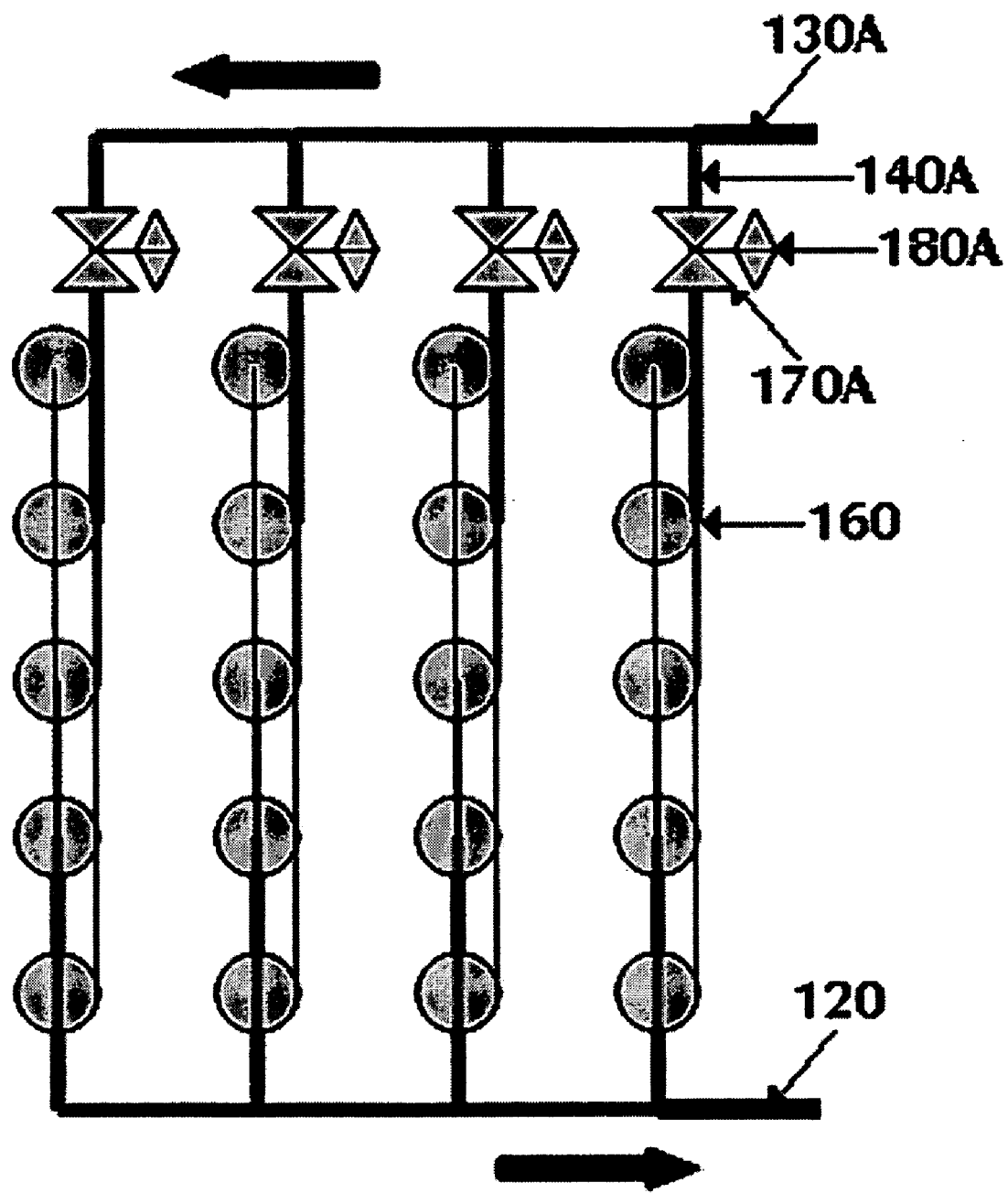
FIG. 2 shows a basic five-well single branch analytical model, delivering 69 tons HVAC at 165 gallons per minute to a building heat exchange, and including means to specify orifice size for equal return flow.
Figure 3:
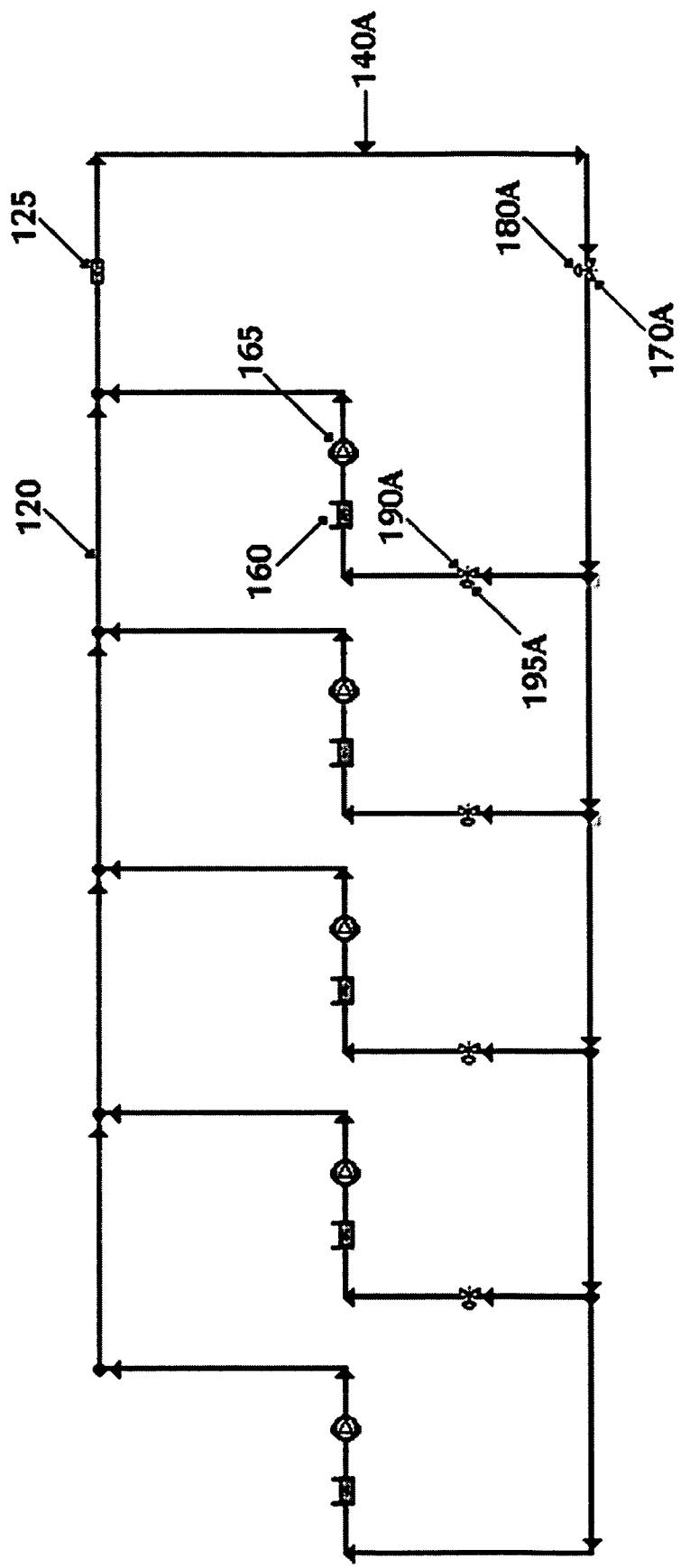
FIG. 3 is a graph of the required orifice diameter at each well for the case of a stepped header with smooth walls (e.g. polypipe, PVC, etc.), such as described in connection with the well configuration shown in FIG. 2, with the following input conditions, namely, center to center well spacing of 15 feet, 5 wells per branch, flow rate per well of 33 gpm, a stepped header design with pipe diameters: 3.0, 2.5, 2.0, 1.5 and 1.25 inches.

To minimize material, installation, control and maintenance costs, it is desirable to design the field array in substantially rectangular geometry, operating rows of wells in discrete branches or blocks (groups of branches), such as illustrated in FIGS. 1, 2 and 3, described in more detail hereinafter. The actual application typically may dictate the use of several branches, particularly with larger tonnage systems, in which each branch may service nominally 2-5 wells. In this preferred scheme for open loop system operation, only those well pumps in a given branch or block are activated. The remainder of the well field is maintained in a ready state, near thermal equilibrium with the down-hole geological formation, i.e., the well waters in the respective wells are normalizing with their environments. By operating only the number of branches required to service the current building load, one can minimize the well field operational expense, while maximizing the availability of the well field, as also described in Applicant's pending U.S. patent application Ser. No. 10/825,659. The ability to select particular branches of water wells for supply to a building heat exchanger, rather than utilizing the entire field array, is unique in this art.

The number of wells in a branch is influenced by several competing factors. These exemplary factors include, but are not limited to, the site available land area for drilling, the heat transfer characteristics of the well bore rock, the total well bore length required to meet the building design load, the actual drilled depth achieved (cost implication), the design spacing between wells, the minimum staged building load to be served, and the installed field cost of pumps, plumbing, control and maintenance.

Clearly, the more shallow the wells, the greater the number of wells required, and the larger the expanse and cost of the field installation. On the other hand, deep wells present their own challenges that can increase the cost of drilling. These include more limited availability of drillers with deep rigs, the challenges and risks that drilling the geological formation present, including the risks of damaging, dropping and retrieving tools down-hole, as well as unanticipated site limitations to drilling, such as encountering significant water production.

The geothermal system of the present invention is a series of standing column wells that are operated similarly to that of a closed-loop system. The wells can be arranged in a variety of patterns. Exemplary patterns include, but are not limited to, linear, rectangular, triangular, or circular arrays. Other regular or irregular patterns may also be used pursuant to the dictates of the topography, geology and perhaps whim of the deployer and owner. In many cases, the center-to-center distance between discrete pairs of wells is selected such that no significant thermal transfer occurs between the wells during the peak use of the system.

In one embodiment, a geothermal system of the present invention employs a group of standing column wells to serve a building load. A typical standing column well includes a borehole that is generally cased until competent bedrock is reached. In some examples, the diameter of the borehole ranges from 6 to 10 inches. The casing can prevent ground water from entering the wet well and contaminating the water therein. The well preferably extends into bedrock. The formation rock provides the heat capacity for the storage of building heat and ample support for the well bore. In a typical SCW, a pipe is dropped into the well to form a core or sleeve through which water is pumped up, and an annulus surrounding the core into which water is returned. The bottom of the pipe may be perforated to form a diffuser, which serves as a filter for the returned water. Thus, a standing column well acts as both a supply well and a diffusion well.

Further details as to the structures and operations of wells in a ground source heat pump system can be found in Applicant's co-pending U.S. patent application Ser. No. 11/657,482 filed Jan. 25, 2007, entitled "Ground Water Heat Transfer Systems and Deployment Thereof," which claims priority to U.S. Provisional Patent Application Ser. No. 60/761,795, filed Jan. 25, 2006, both of which are incorporated herein in their entireties.

In many instances, the performance of a standing column well is independent from the presence or flow of ground water. However, fractures in the bedrock may be desirable in certain instances. These fractures allow water flow within the well and additional surrounding rock, thereby enhancing performance and reducing the required depth. Comparing to other types of geothermal HVAC systems, a standing column well also has a predictable performance without an extensive hydrogeological study. This can significantly reduce the design cost and time.

Examples of suitable standing column wells are provided by U.S. Pat. No. 5,183,100, the entire contents of which are incorporated herein by reference, as well as co-pending U.S. patent application Ser. No. 11/262,740, filed Nov. 1, 2005, entitled "Ground Source Heat Pump Field Design with Improved Control Strategies," which is a Continuation-in-Part of U.S. patent application Ser. No. 10/825,659, filed Apr. 16, 2004, abandoned, and which claims priority to U.S. Provisional Patent Application Ser. Nos. 60/463,032 and 60/463,033, both filed on Apr. 16, 2003, all of which are incorporated by reference in their entireties herein. Additionally, a standing column well can be an open loop well, such as that depicted in FIG. 1, 3, or 4 of U.S. Pat. No. 5,183,100.

In one embodiment, a standing column well employed in the present invention includes an insulating sleeve extending from the bottom of the well to a height above the water level. The insulating sleeve divides water in the well into two portions, a core inside the sleeve and an annulus outside the sleeve. The insulating sleeve is made of material(s) that can reduce or minimize heat and mass transfer between the two areas. In many cases, the bottom or lower part of the sleeve is designed to allow water to communicate between these two areas. A water pump can be used to draw downhole water from inside the sleeve and supply it to a heat pump or another heat exchange device. The water is returned to the annular area surrounding the sleeve after heat exchange. The thermally recovered water then traverses downward and eventually enters the sleeve at the bottom of the well and continues the circulation. This design allows the wellbore surface area to be in intimate contact with the return water. In this fashion, the well forces the water to traverse the entire length of the well before returning in the sleeve, improving the heat transfer between the water and the well wall.

Since the water in a particular standing column well in an SCW system is used intermittently on demand, the water temperature may rise (during building cooling) or fall (during building heating), deviating away from groundwater ambient temperature. This can result in decreased heat pump efficiencies and increased electrical utilization associated with water pumping or back-up heating or cooling.

As noted, a standing column well can recover thermally when it remains inactive, so as to equilibrate thermally with the rock of the wellbore. Applicant's experiments have demonstrated that about half of a day is required for establishing substantial thermal equilibrium (including full equilibrium) with bedrock, depending on the hydrogeology of the site. The mechanism for equilibrium includes conduction and convection of the well water to the face of the rock wellbore, along with thermal diffusion from the wellbore rock.

The installation and operation of a geothermal system of the present invention may be affected by various factors. These factors include, but are not limited to, the field size, the hydrogeology of the site the thermal conductivity and thermal diffusivity of the rock formation, the number of wells, the distribution pattern of the wells, the drilled depth of each well, and the building load profiles. Undersized field installations require higher duty cycles, which may result in more extreme water temperatures and lower HVAC performance in certain cases. Oversized field designs, on the other hand, require more wells, pumps and field plumbing and therefore will be more expensive, albeit adequate to handle almost any load circumstances. The detailed knowledge of the field rock (e.g., porosity, permeability, thermal diffusivity, heat capacity, or other aquifer parameters) may facilitate the determination of the appropriate drilling depth for each well, as well as the number and position of such wells needed at that site. Some of this information may be obtained during the drilling operation.

In many embodiments, the wells employed in the present invention have a drilled depth per ton less than that of traditional groundwater system installations (e.g., 45-120 feet per ton versus 150-200 feet per ton). This may represent a significant decrease in the initial installation cost. In most cases, the wells used in the present invention have drilled depths per ton of no more than 75 feet per ton. Despite the reduced drilled depth per ton, many of the geothermal systems of the present invention can sustain large tonnage capacity (e.g., 200, 300, 400, 500, or more tons) over an extended period of time. This can be achieved by using the staged control strategy of the present invention, which allows certain wells in the field to be operatively active while others are inactive to permit rapid thermal equilibration and quicker reuse. As used herein, a "ton" is equivalent to 12,000 British thermal units (Btu) per hour. A "Btu" is the amount of heat required to raise the temperature of one pound of water one degree Fahrenheit (1° C.). A "Btu" equals to about 252 calories.

As briefly discussed, the distribution pattern of the wells can also affect the operation or efficiency of a geothermal system of the present invention. For many geothermal fields, the thermal conductivities of ground materials are relatively low. See, for example, Table 1 of U.S. Pat. No. 5,183,100. A previous study measured the thermal effect of an operatively active standing column well on an adjacent standing column well. The active well was 1050 feet deep with static water at about 125 feet below grade (i.e., a 900 feet wetted wall surface for heat transfer). The well was operated in conjunction with 20 tons of connected ground water heat pumps. With a bedrock temperature of about 55° F. and a returned water temperature of up to 90° F. into the annular space in the borehole, it took three months to detect any temperature increase in an adjacent well which was 300 feet deep, and only 10 feet away. This study indicated that the movement of energy between deep wells is considerably slow. Combined with the alternate staging control strategy of the present invention, the slow movement of ground heat allows a design of a field in which the center-to-center distance between each two nearest standing column wells can be as little as 15-30 feet, as compared to 50-75 feet required by a typical traditional design.

Any number of wells may be employed in a geothermal system of the present invention, as generally indicated in the figures herein. In many embodiments, a geothermal system of the present invention includes at least 5, 10, 15, 20, 25, 30, or more wells. In many other embodiments, the center-to-center distance between each two wells is selected optimally so that there is no significant heat transfer between any two wells during seasonal use of the system.

In one embodiment, a geothermal system of the present invention is designed such that the center-to-center distance from each well in the system to its closest neighbor well is no more than 50 feet. In another embodiment, the center-to-center distance from each well in the system to its closest neighbor well is from 15 to 50 feet. The use of larger or shorter center-to-center distances is also contemplated by the present invention. In many cases, the field design minimizes land use, packing the wells as tightly as the thermal diffusivity of the geothermal rock will permit, so as to concentrate the stored energy to be utilized in the ensuing season.

Any type of heat exchange device may be used to extract or reject heat from/to a geothermal well. Examples of suitable heat exchange devices include, but are not limited to, various heat pumps. A heat pump extracts heat from one source and transfers it to another. In many embodiments, the heat pumps are reversible and have both heating and cooling modes. The heat pumps can be, without limitation, a water-to-air pump, a water-to-water pump, or a water-to-air split type.

In one embodiment, a geothermal system of the present invention includes a thermal storage to store heat unused during off peak periods. For instance, water heated by a heat pump can be stored in an insulating tank and used when needed. The thermal storage can also be used to collect heat generated from other renewable sources of energy, such as solar energy.

To achieve the operational benefits that the present invention offers, a branch control valve is required to return all or, at least, most or a commensurate amount of water supplied from the wells back to the active branch, which may or may not constitute the same water. Branch control valves can be operated electrically and synchronized with the on-signal for the well pumps in the active branch.

Water returning to the active branch(s) ideally should return equally to each well in the branch. To achieve this performance, minimize field installation cost and insure best practices, a pre-fabricated branch pipe header design is proposed for below-grade application with integral control valve for branch control and with appropriately sized orifices leading into each well in the branch. The orifice size is dictated by the location of a particular well relative to the return water entrance in the branch header. Wells located close to the return water entrance require more obstruction (small orifice size) relative to the most remote well in the branch. By selecting the appropriate size for each return well orifice, one can achieve essentially equal return water mass flow to each well, thus eliminating the need for individual well control. The use of stepped pipe sizes to compose the branch header and individual orifice entry to each well in the branch reduces the expense of using large, one-size, distribution pipe for the header and dropping half of the pressure across each of the small return lines to choke the flow equally, as is used in prior art systems.

Branch control is an ideal solution because it imposes minimal control cost to the overall field array, while offering staged control for meeting diurnal building load with minimal parasitic power. It also provides a benefit to maintenance whereby individual branches can be isolated for pump replacement or other scheduled maintenance without affecting HVAC system operation.

With reference now to FIG. 1 of the Drawings, there is illustrated a field array layout, generally designated by the reference numeral 100, which is divided in this embodiment into two fields, 110A and 110B. As illustrated, water is drawn from wells in the array and enters discharge line 120, which leads to the aforementioned heat exchanger system, generally designated by the reference numeral 120, for use by a building 135. The return water exiting the heat exchanger system can proceed via two paths, a first return line 130A and a second return line 130B.

As illustrated, return line 130A can return water to four branch lines 140A, 140B, 140C and 140D. Similarly, branch lines 150A-150D populate the field 110B. The fields 110 and branches 140 and 150 include a number of discrete wells 160 therein. The branch lines 140 and 150, as shown, include the aforementioned stepped pipe sizes to adequately disperse the return water, as per the usage. As further described and illustrated hereinafter, each branch line 140 is controlled by a signal from a master controller in the building 135. The controller may call for a single branch (minimum load), e.g., branch 140A alone, a block (several branches together), e.g., branches 140, or the entire field 110A and 110B to meet the current building load.

The controller operates from an algorithm that responds to the building anticipated diurnal load profile, the current measured building load and the activity level of each well field branch. The load profile is updated from current weather data (ambient temperature, relative humidity) and information such as day/building occupancy. Additional operational control data may include HVAC system duty cycle and branch operational duration, whereby branch operation greater than some designated % (e.g. 35%) triggers additional branches, while deactivating branches that have been in operation for a specified duration (e.g. 8 hours). The latter insures a period of time off-line to allow the most active wells to thermally relax, i.e. allowing the well water to approach equilibrium with the surrounding rock in the well bore.

With reference now to FIG. 2 of the Drawings, there is illustrated therein a portion of the field array 110 shown in FIG. 1. In particular, field array 110A is illustrated with the branch lines 140 and various wells 160. Also shown are various valves 170 at the mouth of each branch, e.g., a valve 170A is at the mouth of branch line 140A, and a controller 180A is connected to said valve 170A, providing a measure of control to that branch line 140A. Similar control of the other branch lines can be accomplished by corresponding controllers on the respective branch valves.

With reference now to FIG. 3 of the Drawings, there is illustrated therein a portion of the branch line 140 shown in FIG. 2, configured in another way. In particular, branch line 140 further includes discrete controls on each well 160. For example, branch line 140 branches to respective well valves 190, such as well valve 190A which has a controller 195A connected thereto. In this manner, the field controller can more finely control the operation of each well 160 in the field 110. Also shown are the wells 160 with respective pumps 165 to feed the discharge line 120 to the heat exchanger 125.

Accordingly, when a branch line 140 is activated, e.g., branch line 140A, all of the well pumps in that branch are turned on together. With finer control, individual wells may be turned on and off within a branch or between branches e.g., branch 160A and another well elsewhere in the field 110. The flow in the active branch(s) lifts the respective check valves positioned at the end of each branch supply line, as shown in FIGS. 1-3. Inactive branches are therefore isolated from the flow by their respective check valves, thereby preventing water from active branch lines 140 feeding the supply headers of inactive branches or wells therein.

The water from the field array 110 is fed to the building heat exchanger 125, where heat is absorbed by or relinquished from the building 135 as the source for building heat pump or chiller operation.

The return water is sent back to the field array 110, several degrees hotter or cooler than it entered. The return water must now be returned equally or commensurately to each of the active wells. The method, as proposed by the present invention, provides a control valve 170 at the entrance to each return branch line 140. Active branches are designated by having their control valves 170 open; inactive branches prevent water from returning by maintaining their control valves in a closed state. The degree of openness, or alternatively, the introduction of an orifice artificially restricting branch water return flow, may be used to balance return water to each of the wells within active branches. In addition, in order to insure that each well 160 in a given active branch line 140 receives an equal amount of return water, individual well return water lines may contain appropriately sized orifices to restrict the amount of water for those wells that precede the last well in the return water branch, i.e. if orifices were of uniform size, there would be a possibility of overflow in a well closest to the source and possibly no or inadequate water left for the last in the series or chain. The figures illustrate the gradation of orifice sizes along a branch line 140 by thinning the line as it radiates away from the return line 130 or source. An analysis was performed to determine the precise size of the orifices required to balance the return. The orifice size depends on the position of the well relative to the return entrance, header size and pipe fitting flow constraints along the way. This, along with substantiating empirical evidence, formed the basis for the present invention.

Figure 4:
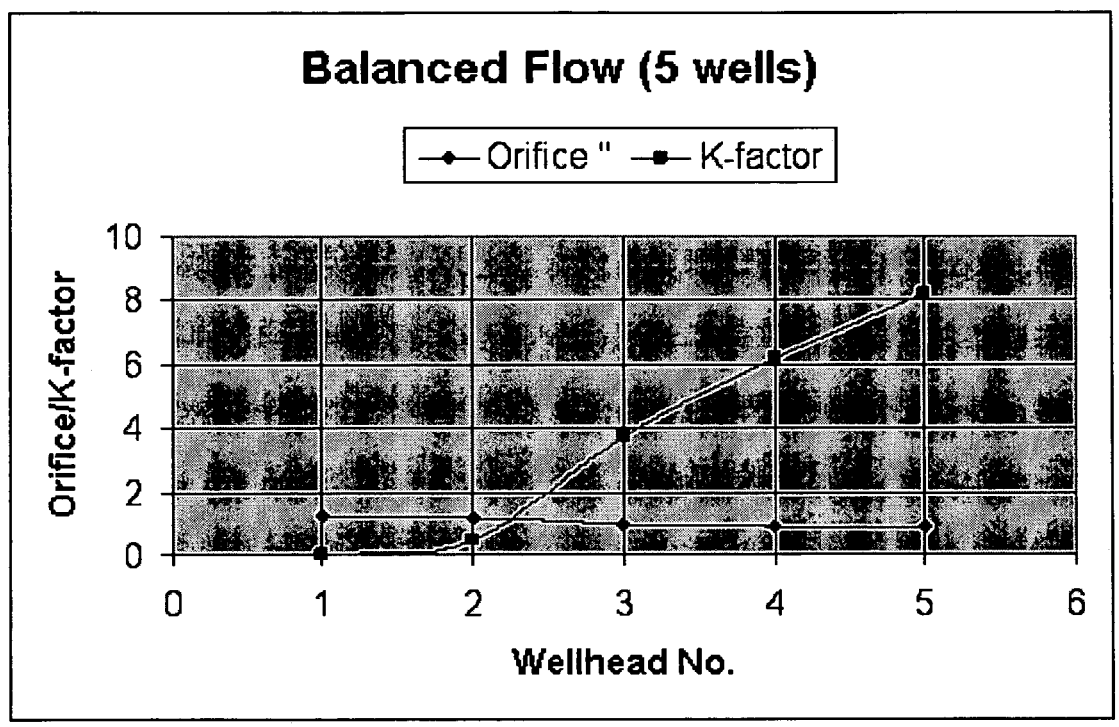
FIG. 4 depicts a larger model similar to the configuration shown in FIG. 2, particularly, a four-branch well field analytical model, delivering 275 tons HVAC at 660 gpm to a building heat exchange, and including means to define branch valve flow control settings for equal branch return flow.

FIG. 4 is a graph of the required orifice diameter at each well for the case of a stepped header with smooth walls (e.g. polypipe, PVC, etc.) with the following input conditions: c-c well spacing=15', 5 wells per branch, flow rate per well=33 gpm, stepped header design with pipe diameters: 3", 2.5", 2", 1.5" and 1.25". FIG. 4 clearly demonstrates the orifice diameters and equivalent K-factors required for each well depending on its location relative to the return water entrance. Other orifice size results were determined based on the specific header design, design flow rate and other factors.

Pre-Fabricated Field Kits

Another embodiment of the present invention is a design specification for the field piping that insures approximately equal and commensurate water return to each well in the geothermal GSHP field of water wells. The intent is to supply sections of branch headers, i.e., the inter-well portions, to field installers with appropriate orifice control mechanisms included to insure consistent standards for deployment and to minimize field array installed cost. Sections can be manufactured and shipped in lengths appropriate to the specified well c-c spacing. Each section of header can be clearly marked for joining in the field to its preceding section. All fittings and flow control can be built into the delivered section. Joining can be accomplished in the field using standard practices, e.g. thermal fusion in the case of polypipe, or gluing in the case of PVC.

The electrical bus for the branch well pump motors and control valves 170 can be run in a conduit together. Signal wiring from the field can be run in a separate signal conduit that is color coded for distinction.

The field array controller is designed to operate in tandem with the building HVAC equipment. The field controller contains its own RISC processor to accomplish the tasks that are specific to the optimum operation of the water well field array.

Branch Design Guidelines

In order to minimize well field installed cost, it is desirable to specify common materials and sizes appropriate for the application, as well as available pumps and control valves that can operate in the environment with little required maintenance. Starting with available submersible water pumps (such as Gould) and rugged, low maintenance, solenoid control valves, a study was undertaken to define the number of wells in a branch that are required to meet a given building load.

Table 1 below computes the well design depth (column 1) required as a function of number of wells in a branch for some common pump sizes (column 3). It also lists the branch pipe sizes (columns 5-8) required to meet the combined flow and based on a design of 8 fps. The pumps were operated at their peak efficiency to produce branch flow rates in the range of 160-180 GPM (column 4). This flow range permitted 3" collection pipe and allowed the use of relatively low cost branch control valves. RainBird®, for example, offers a heavy duty PVC plastic electric remote PGA (Plastic Globe Angle) series control valve for in-ground application that can deliver 160 gpm for under $100. Other plastic valve manufacturers, such as Hayward, offer electrically operated butterfly and ball valves in the price range of $225-700 in the 2-3" size.

The branch layout with four wells (row 2) is highlighted as an ideal design, in that it requires deep wells (833 feet) achievable by the majority of drillers, and utilizes standard water well pumps (e.g., Gould 40GS submersible pump) operating at peak efficiency.

TABLE 1

| (design ft/T) = | 50 | (@ max eff) | (design ft/s) = | 8 | dimensions in inches | | |
| --- | --- | --- | --- | --- | --- | --- | --- |
| #Wells in Branch | Well Depth (ft) | Pump (GPM) | Branch Flow (GPM) | Branch Pipe#2 | Branch Pipe#3 | Branch Pipe#4 | Branch Pipe#5 |
| 5 | 687 | 33 | 165 | 1.84 | 2.25 | 2.60 | 2.90 |
| 4 | 833 | 40 | 160 | 2.02 | 2.47 | 2.86 | |
| 3 | 1249 | 60 | 180 | 2.47 | 3.03 | | |
| 2 | 1666 | 80 | 160 | 2.86 | | | |

An open loop ground source heat pump (GSHP) design for large tonnage applications operating in controlled branches, as proposed, is a solution to reduced well field cost. The proposed design is an improvement upon that set forth in pending U.S. patent application Ser. No. 10/825,659, that specifies an improved control strategy for GSHP well field operation. The present invention envisions the introduction of well field interconnection kits as a means to lower cost in such systems, while providing high-quality deployment.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A ground source heat pump system comprising:
   a plurality of geothermal wells, said plurality of geothermal wells being arranged in a plurality of branch or block arrays; each said plurality of branch or block arrays being active or inactive;
   a building heat exchanger that thermally regulates the water from said plurality of geothermal wells to said plurality of active branch or block arrays;
   a branch control valve that selectively activates or deactivates at least one of said plurality of branch or block arrays; and
   a plurality of pipes defining each said plurality of branch or block arrays and having stepped diameter sizes for restriction of water returning to each of said plurality of geothermal wells in said at least one plurality of branch or block arrays, whereby each of said plurality of geothermal wells receives substantially equal return water mass flow.

2. The ground source heat pump system of claim 1, wherein said plurality of geothermal wells are operated as standing column wells in a closed loop.

3. The ground source heat pump system of claim 1, wherein said at least one of said plurality of branch or block arrays comprise 2-5 geothermal wells therein.

4. The ground source heat pump system of claim 1, wherein said plurality of geothermal wells are arranged in a linear, rectangular, triangular or circular array.

5. The ground source heat pump system of claim 1, wherein said plurality of geothermal wells are arranged in a rectangular geometry.

6. The ground source heat pump system of claim 1, wherein the center to center distance between adjacent said geothermal wells is between about 15-50 feet.

7. The ground source heat pump system of claim 1, wherein said plurality of pipes defining each said plurality of branch or block arrays and having stepped diameter sizes that are arranged in descending diameters from the return water entrance.

8. The ground source heat pump system of claim 7, wherein the stepped diameter size is dependent on the location of a particular geothermal well relative to the return water entrance in the branch.

9. The ground source heat pump system of claim 8, wherein at least one branch comprises sections of pipe of increasing or decreasing diameters.

10. The ground source heat pump system of claim 1, wherein said branch control valve is electrically-operated.

11. The ground source heat pump system of claim 1, further comprising a controller, said controller operates from an algorithm that activates or deactivates at least one of said plurality of branches upon occurrence of a condition to meet the current building load.

12. The ground source heat pump system of claim 11 wherein said condition is selected from the group consisting of the anticipated diurnal load profile of a building, the current measured building load, the geothermal well water temperature, the thermal recovery time of at least one well, the heat exchange time of at least one well, the activity level of respective branch arrays, the expected daily use, outside temperature, and climatic or building historical data records.

13. A water well field hydraulic branch plumbing kit for large tonnage ground source heat pump applications comprising:
   a plurality of sections of pipe connecting a plurality of geothermal wells arranged in a plurality of branch arrays, said each pipe being manufactured in lengths appropriate to a specified well center to center spacing and including markings for designating a manner for joining a respective pipe in the field to its preceding section;
   a plurality of branch pipe stepped fittings, each fitting connected adjacent each said geothermal well to respective pipe sections;
   a field array controller in communication with a building, said controller activating and deactivating a plurality of geothermal wells;
   submersible water pumps operating in each of said geothermal wells; and
   a plurality of branch control valves, regulating return water flow to respective geothermal wells in respective pipes in said branch arrays so as to maintain equal return water mass flow to each well, thereby eliminating the need for individual well control.

14. The water well field hydraulic branch plumbing kit according to claim 13, wherein said field array controller comprises a RISC processor.

15. The water well field hydraulic branch plumbing kit according to claim 13, wherein each said plurality of branch pipe stepped fittings are joined together by thermal fusion or gluing.

16. The water well field hydraulic branch plumbing kit according to claim 13, wherein the size of each said plurality of branch pipe stepped fittings range typically from 1.25-3.0 inches.

17. The water well field hydraulic branch plumbing kit according to claim 13, wherein the electrical buss for the motor of said water pumps and said branch control valves is run in the same conduit.

18. The water well field hydraulic branch plumbing kit according to claim 13, wherein signal wirings from the branch arrays are run in respective signal conduits.

19. A ground source heat pump system comprising:
   a plurality of geothermal wells, said plurality of geothermal wells supplying water to a heat exchanger and said water then being returned to said geothermal wells; and
   a flow control system, said flow control system comprising respective return stepped diameter pipes on each said geothermal well for controlling the water being returned to said respective geothermal well, whereby the amount of water removed from each said geothermal well is commensurate with the amount of water returned.

20. The ground source heat pump system of claim 19, wherein said plurality of geothermal wells are arranged in at least one branch, whereby commingled water flows from each said geothermal well in said at least one branch to said heat exchanger and commensurate amounts of water return to the respective geothermal wells in said at least one branch.

21. The ground source heat pump system of claim 20, wherein respective return pipes on each said geothermal well in said at least one branch have a different size diameter therethrough for returning said water.

22. The ground source heat pump system of claim 21, wherein the diameter of said return pipe at the return water intake portion of said at least one branch is smaller than the diameters of subsequent return pipe of said at least one branch.

23. A ground source heat pump kit comprising:
   a plurality of branch pipes corresponding to a respective plurality of geothermal wells within a well branch and connected thereto, the branch pipes within said well branch having respective flow controls therein, whereby water flows from the respective branch pipes through the respective flow controls therein into each geothermal well can be governed pursuant to the position of the respective geothermal wells in said well branch; and
   a plurality of branch sections, said branch sections configured to interconnect said branch pipes on each of said geothermal wells in said well branch to each other and to an intake pipe and an output pipe, whereby the branch pipes and the branch sections are modular, and whereby the respective branch pipes with respective controls therein are labeled for ease of placement along said well branch.

24. A control for a ground source heat pump system having a plurality of geothermal wells, comprising:
   a plurality of geothermal wells arrayed in a field, said field having a plurality of branch lines, each said branch line having at least one geothermal well therein;
   each geothermal well in said field having a well control valve associated therewith, said well control valve having activation means therein to activate and deactivate the respective well upon receipt of a well control signal such that equal return water mass flow to each well is maintained by said well control valve; and
   a controller, said controller sending respective well control signals to respective well control valves upon occurrence of a condition.

25. A control for a ground source heat pump system having a plurality of geothermal wells, comprising:
   a plurality of geothermal wells arrayed in a field, said field having a plurality of branch lines, each said branch line having at least one geothermal well therein;
   each branch line in said field having a branch line control valve associated therewith, said branch line control valve having activation means therein to activate and deactivate the respective branch lines upon receipt of a branch control signal such that equal return water mass flow to each well is maintained by said well control valve; and
   a controller, said controller sending respective branch control signals to respective branch line control valves upon occurrence of a condition.

26. A ground source heat pump system comprising:
   a plurality of geothermal wells, said wells connected serially by a water return line, said water return line returning water from a heat exchanger in said system;
   said water return line having respective stepped pipe diameters, the number of stepped pipe diameters being commensurate with the number of said wells serially arranged, wherein the respective pipe diameters step upward in size downstream, whereby the amount of water flowing into the first pipe diameters are controlled, enabling subsequent wells to obtain water, whereby each said well in the series obtains a commensurate volume of water.

27. A method for deploying a water return line in a ground source heat exchange system, comprising:

installing said water return line to a heat exchanger and extending said water return line to a plurality of geothermal wells, said wells being connected serially to said water return line; and deploying a respective plurality of pipe diameters to said water return line at positions substantially adjacent said wells, wherein the respective pipe diameters step upward in size downstream whereby the amount of water flowing into the first orifice members are controlled, enabling subsequent wells to obtain water, whereby each said well in the series obtains a commensurate volume of water.

* * * * *